United States Patent [19]

Martino et al.

[11] Patent Number: 5,115,339
[45] Date of Patent: May 19, 1992

[54] STEREOMICROSCOPE

[75] Inventors: Ronald J. Martino, Geneva; Fred J. Ramsey, Rochester, both of N.Y.

[73] Assignee: Cambridge Instruments Inc., Buffalo, N.Y.

[21] Appl. No.: 376,235

[22] Filed: Jul. 3, 1989

[51] Int. Cl.⁵ ............... G02B 21/22; G02B 27/22
[52] U.S. Cl. ............................. 359/378; 359/468; 359/472
[58] Field of Search ............ 350/319, 578, 500–522, 350/172, 174, 130–143; 358/91, 111; 351/158, 168, 172; 354/120

[56] References Cited

U.S. PATENT DOCUMENTS

| | | | |
|---|---|---|---|
| 3,495,891 | 2/1970 | Lee | 350/517 |
| 3,879,107 | 4/1975 | Chaban | 350/138 |
| 3,935,011 | 1/1976 | Schindl | 354/120 |
| 4,017,147 | 4/1977 | Weber et al. | 350/512 |
| 4,281,923 | 8/1981 | Friedman | 350/517 |
| 4,698,564 | 10/1987 | Slavin | 351/158 |
| 4,712,889 | 12/1987 | Schindl | 350/511 |
| 4,761,066 | 8/1988 | Carter | 350/510 |
| 4,781,435 | 11/1988 | Lippmann et al. | 350/130 |
| 4,830,482 | 5/1989 | Resnikoff | 351/172 |
| 4,861,997 | 8/1989 | Marx | 350/130 |

Primary Examiner—Bruce Y. Arnold
Assistant Examiner—Thong Nguyen
Attorney, Agent, or Firm—Bean, Kauffman & Spencer

[57] ABSTRACT

A stereomicroscope for comparing photographs is disclosed. The microscope includes a pair of complementary occluders with one occluder positioned in an intermediate image plane of each side of the stereo optical system, which also includes a conventional image rotator and zoom system to permit independent adjustment of the orientation and size of each image. The complementary occluders accentuate small differences between nearly identical photographs by providing a border at which an object present in only one photograph will appear or disappear as the two photographs are simultaneously scanned.

11 Claims, 3 Drawing Sheets

STEREOMICROSCOPE

BACKGROUND OF THE INVENTION

The present invention relates to stereomicroscopes, and more particularly to stereomicroscopes used to detect differences between substantially identical photographs, either aerial photographs or photographic masks used by the semiconductor industry.

Chaban U.S. Pat. No. 3,879,107, issued Apr. 22, 1975, discloses a stereomicroscope of the type used to compare aerial photographs. The disclosed stereomicroscope has a pair of rhomboid arms used to position the respective objectives over the pertinent portion of a respective aerial photograph. Each rhomboid arm contains an independent zoom system to produce an intermediate image which is then relayed to an image rotator. A beam splitter selectively placed on the optical axes permits either mono or stereo presentation of the images.

Stereomicroscopes of the type disclosed in the Chaban patent are conventionally used to compare two aerial photographs or a mask with a master, in connection with the preparation of semi-conductor wafers, by placing one of the photographs or wafer or mask under one rhomboid arm and the other photograph or wafer or mask under the other rhomboid arm. The rhomboid arms are then moved until substantially the same object is located in each photograph. The fields of view are then angularly adjusted by the operator, using the image rotators, to rotate either or both images until they both have an identical orientation. The operator then adjusts either or both zoom systems until the sizes of the two images are identical. It may then be necessary to slightly reposition the rhomboid arms or one of the photographs or wafers or masks until the two fields are identical, which may also require a further adjustment of the image rotators. Although not disclosed in the Chaban patent, it is conventional in such stereomicroscopes to permit superimposition of the images. That is, the image from one rhomboid arm is presented to both eyepieces and the image from the other rhomboid arm is presented to both eyepieces. Many operators prefer to use this superimposed mode to conveniently obtain proper orientation, image size an identical fields.

Prior to the present invention, differences between substantially identical photographs were identified by an operator using mental recall. After the orientation, size and identical fields had been selected using a procedure of the type described above, an operator would then switch to the mono mode, that is, viewing one photograph through one eyepiece and then switching to view the other photograph through the other eyepiece, while relying on mental recall to detect an observed difference. Some operators preferred to use the biocular mode, if available, i.e. view one photograph through both eyepieces and then the other photograph through both eyepieces. This still depended upon the operator to recall specifics of one image while viewing another. Yet another possibility involved viewing one stereo pair of photographs on one stereo viewing instrument and viewing a second stereo pair of photographs of the same scene on another stereo viewing instrument and again using mental recall attempt to detect differences between the photograph stereo pairs. This method is especially cumbersome and requires two viewing instruments. This prior art procedure had the obvious disadvantage that it was highly dependent upon operator skill and the operator's ability to recall precise details of the prior image while viewing the subsequent image.

BRIEF DESCRIPTION OF THE PRESENT INVENTION AND DRAWINGS

By scanning photographs with a stereomicroscope having complementary occluders placed in intermediate image planes, the operator can observe superimposed fields showing either the appearance or disappearance of an object or component of an object as it moves across the border between the respective occluders.

FIG. 4 is a left side view, partly in section, showing the mounting for occluder 5a;

DETAILED DESCRIPTION OF THE INVENTION

Figure 1:
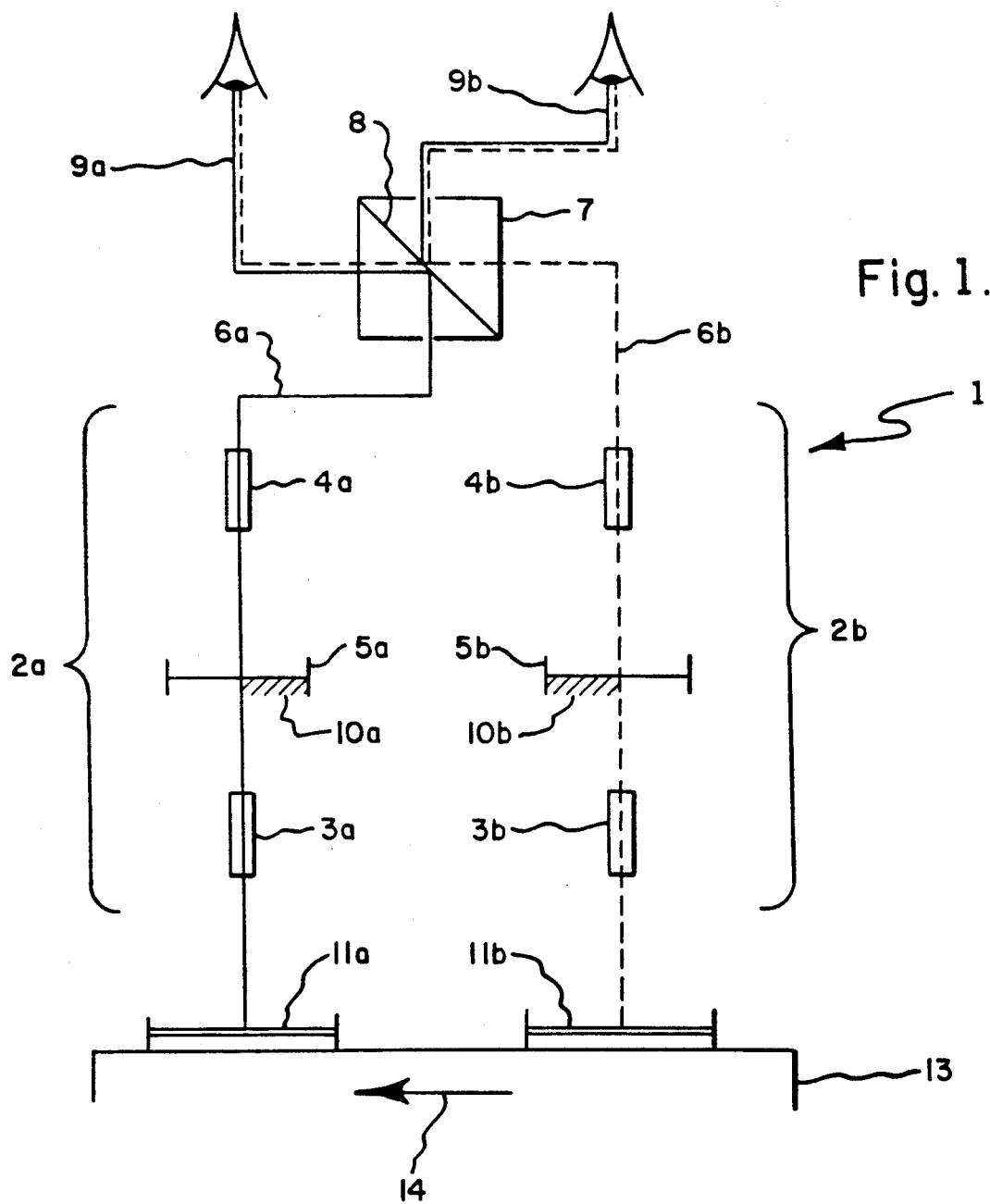
FIG. 1 is a diagrammatic representation of a typical stereomicroscope illustrating the location of the complementary occluders in the respective intermediate image planes.
Figure 2A:
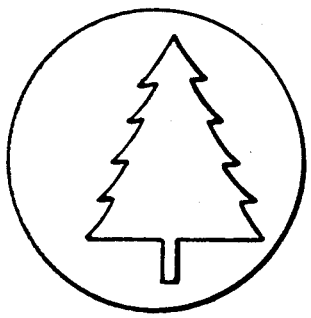
FIGS. 2a and 2b represent respective images in each of the pair of imaging systems without occluders.
Figure 2B:
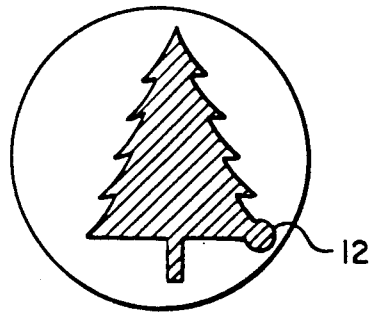

Referring to FIG. 1, a stereomicroscope is generally indicated by 1 and may be of the type taught by Chaban. Stereomicroscope 1 has first and second imaging systems 2a and 2b with each having a zoom system 3a, 3b; each having an image rotator 4a, 4b; and each having an intermediate image plane 5a, 5b lying on the optical axes 6a, 6b. Optical axes 6a and 6b intersect at mode selector 7. When stereomicroscope 1 is operated in the superimposition mode, mode selector 7 has a 50/50 beam splitter at interface 8 which directs 50% of the total image received along axis 6a along ocular axis 9a, and 50% of the total image received along axis 6a along ocular axis 9b. Similarly, 50% of the image received along optical axis 6b is directed along ocular axis 9a and 50% along ocular axis 9b. A pair of complementary occluders 10a, 10b are selectively positioned in a respective one of intermediate image planes 5a and 5b. Two photographs 11a and 11b are positioned with each being located below a respective imaging system to provide a substantially identical field at intermediate image planes 5a and 5b. When mode selector 7 is positioned, as taught by Chaban, in a position to permit only the light received from axis 6a to pass along ocular axes 9a and 9b, an object such as that shown in FIG. 2a would be observed. If mode selector 7 was moved, as taught by Chaban, to a position permitting only light received along axis 6b to pass along ocular axes 9a and 9b, a substantially identical image would be observed such as that shown in FIG. 2b. When mode selector 7 is in the superimposed position, the observed field would appear as that shown in FIG. 2a after the steps of angular orientation, magnification adjustment and positioning of the photographs had been conducted. The cross hatching shown in FIG. 2a is only for purposes of distinction. It can be seen that when the prior art apparatus and procedure was followed the identification of difference 12 shown in FIG. 2a could be made only by switching between the two figures. It should be noted that when photographs used in the preparation of a topographical map, for photointerpretation or two semi-conductor masks are being compared, the images being viewed will not have the simplicity of FIGS. 2a and 2b nor will the difference usually be as distinctive.

Figure 3A:
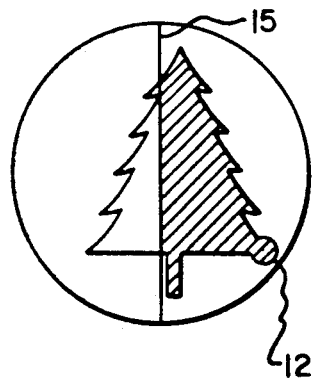
FIGS. 3a, 3b and 3c represent sequential images as they would appear during a scan of a pair of photographs with occluders.
Figure 3B:
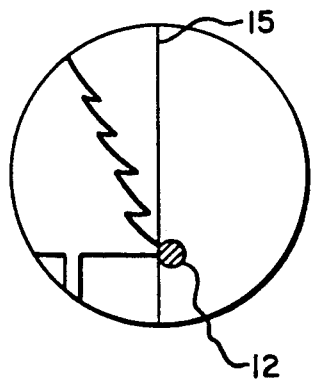
Figure 3C:
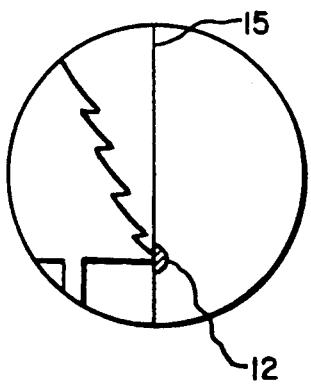

When complementary occluders 10a and 10b are placed in the respective intermediate image planes 5a and 5b; mode selector 7 is in the superimposed position shown in FIG. 1; and the common photograph support 13 is moved in the direction of arrow 14, a difference 12 will be observed to disappear as shown in the sequence of FIGS. 3a, 3b and 3c as it passes boundary 15 of complementary occluders 10a and 10b. Obviously, the photographs may remain stationary and the occluders be moved as a unit to obtain the same result.

Figure 4:
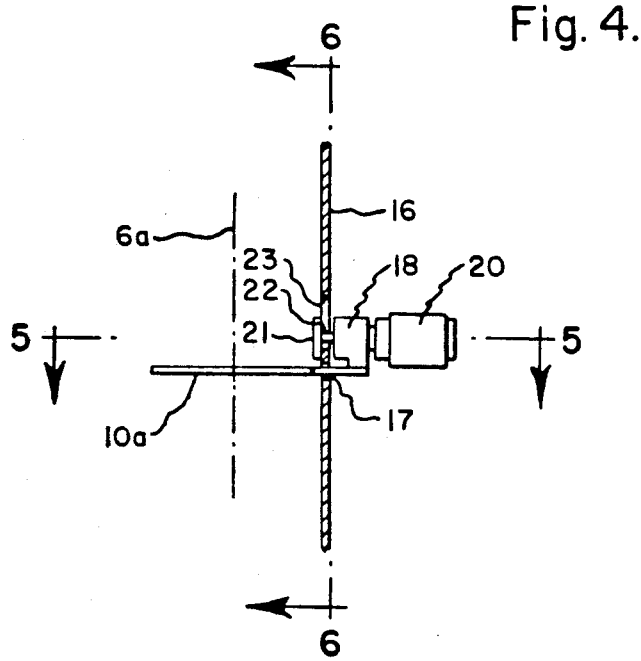
Figure 6:
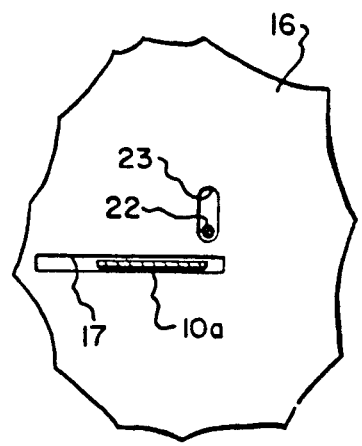
FIG. 6 is a sectional view along line 6—6 in FIG. 4.
Figure 5:
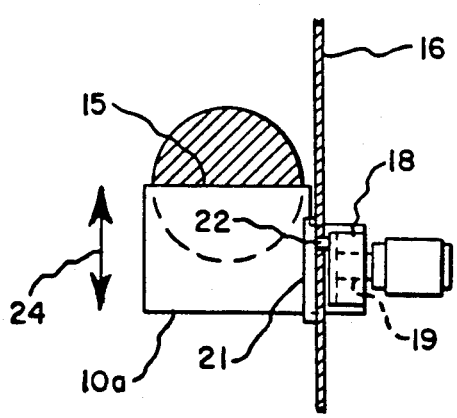
FIG. 5 is a sectional view along line 5—5.

Referring to FIGS. 4, 5 and 6, stereomicroscope nonmagnetic side wall 16 has a slot 17 extending perpendicular to optical axis 6a to receive occluder 10a. block 18 carries rotatable eccentric 19 which is operated by knob 20. Magnet 21 draws block 18, made of a magnetic material such as steel, against side wall 16, but permits adjustment of occluder 10a when pin 22, which engages slot 23, is rotated by means of knob 20 to provide movement of occluder 10a in the directions shown by arrows 24. Complementary occluder 10b may be mounted in a similar manner using a magnet and steel block. It has not been found necessary that both occluders be adjustable in order to accurately position boundary 15. As shown in FIG. 5, the shaded portion of the field at intermediate image plane 5a corresponds to the shaded image part shown in FIGS. 3a, 3b and 3c.

What is claimed is:

1. A stereomicroscope optical system for viewing a composite image of complementary portions of two identical fields of substantially identical photographs and indicating any difference therebetween which comprises:
   a first optical means for presenting a first image from one of the two photographs, said first means including a first intermediate image plane, a first occluder selectively positionable in said first intermediate image plane, said first occluder blocking a chosen part of the first image for providing a first composite image part;
   a second optical means for presenting an second image from the other of the two photographs, said second means including a second intermediate image plane, a second occluder selectively positionable in said second intermediate image plane, said second occluder blocking a complementary part of the second image for providing a second composite image part;
   means to position said first and second occluders in their respective image planes;
   means to combine said first and second composite image parts; and
   means to move said photographs simultaneously relative to said occluders,
   whereby a difference between photographs is identified during transition between image parts.

2. A system according to claim 1, wherein each of said chosen and complementary parts are one half of the image.

3. A system according to claim 1, wherein said first optical means includes first zoom means for varying the magnification at said first intermediate image plane and said second optical means includes second zoom means for varying the magnification at said second intermediate image plane.

4. A system according to claim 1, wherein said first optical means includes first image rotating means for varying the image orientation at said first intermediate image plane and said second optical means includes second image rotating means for varying the image orientation at said second intermediate image plane.

5. A system according to claim 3, wherein said first optical means includes first image rotating means for varying the image orientation at said first intermediate image plane and said second optical means includes second image rotating means for varying the image orientation at said second intermediate image plane.

6. A system according to claim 1, wherein said means to position said first and second occluders is adapted to change said chosen part of said image that is blocked.

7. A system according to claim 1, wherein said means to position said first and second occluders is adapted to adjust said complementary part of said second image that is blocked in response to a change in said chosen part.

8. A system according to claim 5, wherein said means to position said first and second occluders is adapted to adjust said complementary part of said second image that is blocked in response to a change in said chosen part.

9. A system according to claim 8, wherein each of said chosen and complementary parts are one half of the intermediate image.

10. A system according to claim 1, wherein said first optical means includes first zoom means for varying the magnification at said first intermediate image plane and said second optical means includes second zoom means for varying the magnification at said second intermediate image plane; said first optical means includes first image rotating means for varying the image orientation at said first intermediate image plane and said second optical means includes second image rotating means for varying the image orientation at said second intermediate image plane; and each of said chosen and complementary parts are one half of the intermediate image.

11. A method of detecting differences in nearly identical photographs comprising the steps of:
   presenting an image of a field from one of the photographs to a first intermediate image plane;
   occluding a chosen part of the intermediate image for providing a first composite image part;
   presenting an image of a field from the other of the photographs to a second intermediate image plane;
   occluding a complementary chosen part of the intermediate image for providing a second composite image part;
   combining said first and second composite image parts at an image plane to provide a transition boundary;
   moving the two photographs as a unit; and
   observing said transition boundary for irregularities caused by differences between the two photographs.

* * * * *